United States Patent Office 2,825,265
Patented Mar. 4, 1958

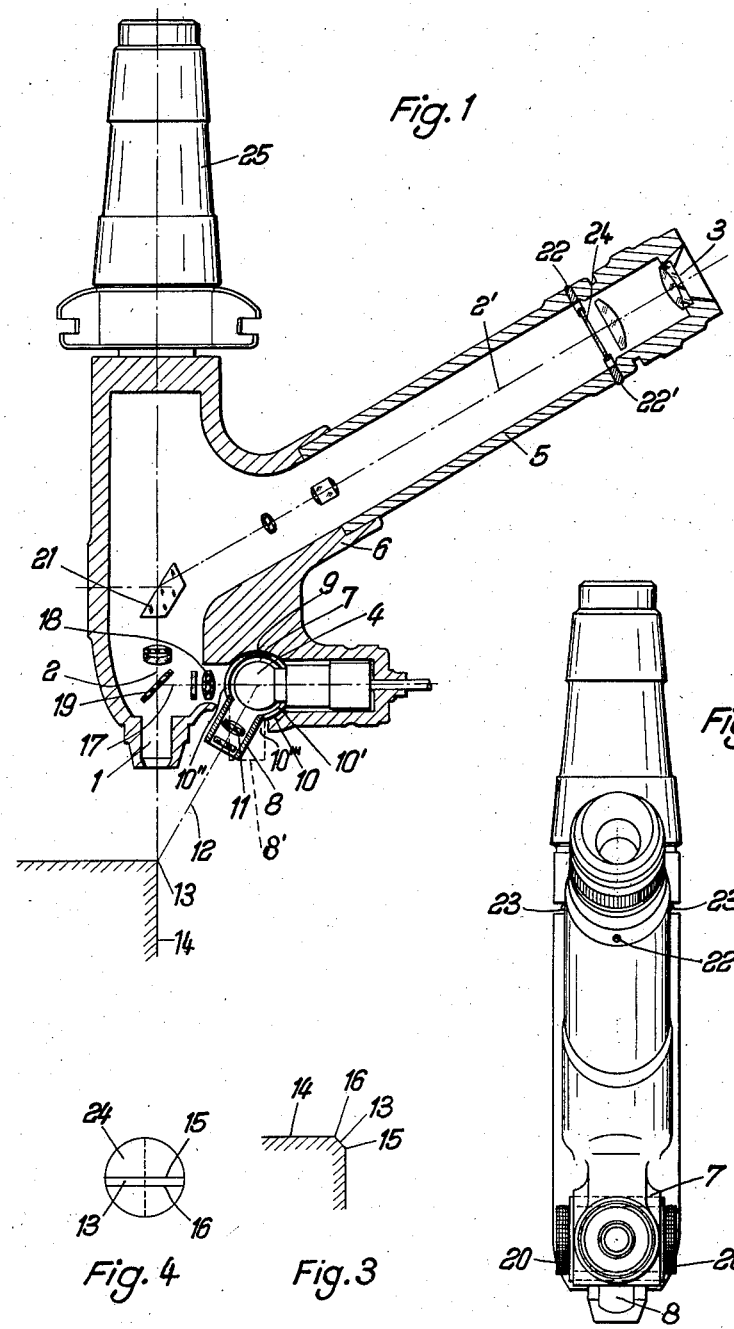

2,825,265

TOOL MAKER'S MICROSCOPE FOR DETACHABLE MOUNTING IN A SPINDLE OF A MACHINE TOOL

Erich Hoffmann, Berlin-Zehlendorf, Germany, assignor to Herbert Lindner G. m. b. H., Berlin-Wittenau, Germany Application June 22, 1955, Serial No. 517,226

Claims priority, application Germany June 29, 1954

11 Claims. (Cl. 88—39)

This invention relates to machine tools, and more particularly to tool makers' microscopes for detachable connection with machine tools having movable tool spindles for receiving the tools. The microscope according to the present invention may be particularly advantageously used in conjunction with a boring machine, in particular a coordinate boring machine.

Tool makers' microscopes are used on machine tools for the purpose of facilitating the fine adjustment of the tool of the machine tool to the work piece or in the alternative the fine adjustment of the work piece to the tool. A frequent use of such microscopes is for bringing the basic edge or reference edge of the work piece, in exact register with the axis of the spindle of the machine tool, that is, that edge which is used as the starting line for the various measurements.

Hitherto, however, it is impossible to obtain a satisfactory sharp and clear picture of the reference edge to be sighted by means of the customary tool maker's microscopes; it is still necessary to make use of auxiliary means i. e. for example a slotted adjusting angle which is placed on the reference edge of the work piece, and the slot of which is sighted in the microscope.

It is an object of the invention to provide a microscope for the purpose referred to which renders possible to bring a desired line or edge for example the reference edge of a work piece in exact register with the axis of a tool spindle without the use of additional auxiliary means.

The reference edge of a work piece to be sighted is usually not a line proper but includes a chamfered surface having two parallel defining lines which in the ocular of known microscopes cannot be clearly and sharply recognized and distinguished but which result in a somewhat blurred picture. However, for the purpose of exactly adjusting and registering a reference edge of a work piece with the spindle of the machine tool a sharp and clear picture of at least one of the two defining lines of the chamfered surface of the reference edge is required, and said defining line has to be exactly aligned with one of the cross wires of the ocular.

Accordingly, it is a further object of the invention to provide a microscope in the ocular of which at least one defining line of the chamfered reference edge of the work pieces to be sighted can be clearly and sharply seen and observed for proper adjustment.

It is a still further object of the invention to provide a microscope for the purpose referred to which, if so desired, can be used in conjunction with the common additional, auxiliary means, for example a slotted adjusting angle, without necessitating any modification or adjustment of the microscope.

Yet another object of the invention is to provide a microscope which has a very wide scope of use and which can be employed in combination with a large number of different machine tools.

Still another object of the invention is the construction of a microscope for the purpose of facilitating the fine adjustment of the axis of a spindle of a machine tool to a predetermined edge of a work piece for example the reference edge, or, in the alternative, the fine adjustment of a predetermined edge for example the reference edge, of a work piece to the axis of a spindle of a machine tool, wherein said adjustment can be carried out with a greater accuracy than was hitherto possible.

It is also an object of the invention generally to improve on the art of tool makers' microscopes for the purpose indicated, as now customarily made.

It is a further object of the invention to provide a microscope which can be detachably mounted in the bore of a spindle of a machine tool in such a manner, that the axis of said spindle coincides with the optical axis of the objective of the microscope.

Other objects and structural details of the invention will be apparent from the following description when read in conjunction with the accompanying drawings forming part of this specification, wherein:

Fig. 1 is a front elevational view of a microscope in accordance with the invention, partly in section, Fig. 2 is a side elevational view of the microscope shown in Fig. 1, Fig. 3 is a fragmentary sectional view of a work piece, Fig. 4 shows the optical picture of the chamfered edge of the work piece shown in Fig. 3 when viewed through a microscope shown in Figs. 1 and 2.

The microscope illustrated in Fig. 1 is shown in position above a work piece 14. For the purpose of mounting the microscope it is provided with a connecting means or stepped, conical shaft portion 25 which may be inserted into the bore of a spindle of a machine tool, for example a boring machine (not shown). The microscope comprises a casing 6 which comprises the objective 1 and carries an upwardly inclined projecting tubular member 5 the right hand end of which (as seen in Fig. 1) includes the ocular 3. The optical axis 2 of the objective coincides with the axis of the spindle of the machine tool (not shown) while the optical axis 2' of the ocular 3 is at an angle to the optical axis 2. A light source 4 is accommodated in a chamber 7 formed by the casing 6 below the tubular member 5 and lateral to the optical axis 2. An illuminating member comprising a tubular portion 8, which merges into a cylindrical portion 10, and lenses 11 fitted within the tubular portion 8, is rockably mounted in bearings formed by the cylindrical walls 9 of the chamber 7. The cylindrical portion 10, which partly encloses the light source 4, has an opening 10" for the passage of a light beam travelling along the optical axis 17 and emanating from the light source 4, so as to extend towards the optical axis 2, while a second light beam from the same source passes through the tubular portion 8 of the illuminating member. A further opening 10' is provided in the cylindrical portion 10 with a view to enabling the insertion of the light source 4 thereinto. The optical axis 12 of the lenses 11 extends and points towards the edge 13 of the work piece to be sighted when the illuminating member 8 is in the position shown in full lines. The tubular portion 8 of the illuminating member projects through an opening 10''' of the chamber 7 which opening is so large that the illuminating member 8, 10 can be freely rocked from the position shown in full lines into the position 8' shown in dotted lines wherein the optical axis 12 is substantially parallel to the optical axis 2 of the objective 1. The width of the opening 10" is chosen in such a manner that a light beam can freely pass therethrough towards the optical axis 2 even when the illuminating member 8 is in the position 8'.

In the path of the optical axis 17 which is at right angles to the optical axis 2 there are provided lenses 18 while an optical flat 19 is arranged at the point of intersection between the optical axes 17 and 2. The optical flat 19 is at an angle of 45° to the optical axis 17 so that the light beam travelling along said axis 17 is reflected into the optical axis 2. This latter beam passes thus vertically through the objective 1 towards the edge 13 while the light beam passing through the illuminating member 8, 10 approaches the edge laterally. The rocking axis of the illuminating member 8, 10 passes through the point of intersection of the optical axes 12 and 17. Two knobs 20 (Fig. 2) are operatively connected with the illuminating member 8, 10 for rocking the latter into the desired position.

A prism 21 is arranged at the point of intersection of the optical axes 2 and 2'. A plate 24 having crossed wires being arranged in the tubular member 5 near the ocular end thereof can be adjusted in the direction of the wires by adjusting screws 22, 22' and 23, 23', respectively.

Fig. 3 is an enlarged view of the edge of the work piece shown in Fig. 1. It will be seen therefrom that the edge is not a line proper but is constituted by a chamfered surface 13 defined by the defining lines 15 and 16.

The operation of the microscope according to this invention is as follows:

The conical shaft member 25 is first inserted into a bore of a spindle of a machine tool for example a co-ordinate boring machine, so that the optical axis of the objective of the microscope coincides with the axis of the conical shaft portion 25 and thus that of the spindle. If it is desired first to check whether the cross wires of the adjustable plate 24 are in accurate relation to the axes of the conical shaft portion 25 and of the spindle the following procedure may be adopted: One of the wires of the crossed wires 24 is first brought into alignment with the slot of an adjusting angle placed on a suitable member whereafter the microscope is turned through 180° by turning the spindle of the machine tool. In case a deviation between the wire and the slot is observed, the adjusting angle is adjusted by half the amount of this deviation. The slot of the adjusting angle and the wire of the plate 24 are thereafter again brought into alignment by adjusting the plate 24 by means of its adjusting screws and, thereafter, the microscope is turned back through 180°. The procedure is repeated until no deviation between the two positions of the microscope can be observed. If desired, this procedure may be repeated by establishing and adjusting the deviation obtained by turning the microscope through 90°.

When no checking of the position of the wire cross is to be carried out and the optical axis 2 of the objective 1 has been properly brought into alignment with the axis of the spindle the sighting of the reference edge of a work piece 14 can be readily performed. The light beam originating from the light source 4 and travelling through the opening 10" and along the optical axis 17 is reflected by the optical flat 19 into the optical axis 2 through the objective 1 and onto the edge 13. At the same time a second light beam originating from the same light source 4 passes through the tubular portion of the illuminating member 8 with the lenses 11 until it intersects the first mentioned light beam. The position of the rockable illuminating member 8 is adjusted by means of the knobs 20 until the point of intersection of the optical axes of the two light beams coincides with the defining line, for example the line 15, of the edge to be sighted and to be brought into alignment with one wire of the cross wires as shown in Fig. 4. This line 15 is thus illuminated by a light beam from above and one approaching laterally and can be clearly and sharply seen in the ocular 3 of the microscope. It will be seen that the illuminating member 8, 10 can be easily adjusted into the optimal position by turning the adjusting knobs 20.

As has been previously pointed out the axis about which the illuminating member is rocked passes through the point of intersection of the optical axes of the two light beams. In this manner the light source 4 always remains in the point of intersection of these axes irrespective of the position of the illuminating member 8 whereby light straying is avoided.

In case it is desired to use the microscope in conjunction with the hitherto customary, additional auxiliary means, for example a slotted adjusting angle, the illuminating member is moved into the position 8' shown in dotted lines in which case only the light beam approaching from above will illuminate the slot of the adjusting angle.

I have described a preferred embodiment of my invention, but it is understood that this disclosure is for the purpose of illustration, and that various omissions and changes in shape, proportion and arrangement of parts, as well as the substitution of equivalent elements for the arrangements shown and described may be made without departing from the spirit and scope of the invention as set forth in the appended claims.

What I claim is:

1. A tool maker's microscope for detachable mounting in a spindle of a machine tool comprising in combination: connecting means for co-axial insertion into the bore of said spindle; a casing mounted on said connecting means; an objective arranged on said casing, the optical axis of said objective coinciding with the axis of said connecting means whereby said optical axis of the objective coincides with the axis of said spindle when said connecting means is inserted into said bore; viewing means arranged on said casing, the optical axis of said viewing means extending angularly to said optical axis of said objective; a light source arranged on said casing for generating light, first means for directing a first portion of said light along said optical axis of said objective and through the latter from above onto a defined line of a work piece; and second means for directing and adjusting the path of a second portion of said light generated by said light source at will between two end positions, said second light portion intersecting in one of said end positions the optical axis of said objective outside said microscope, whereby said second light portion may also be directed onto said defined line of the work piece.

2. A tool maker's microscope for detachable mounting in a spindle of a machine tool, comprising in combination: connecting means for coaxial insertion into the spindle of the machine tool, a casing including an ocular and an objective, the optical axis of said objective being in alignment with the longitudinal axis of said connecting means, the optical axis of said ocular being at an angle relative to the optical axis of said objective, said casing having a lateral chamber outside the optical axis of said objective and communicating with the interior of said casing, a light source arranged in said chamber, a light distributing member rockably mounted in said chamber, said light distributing member having an opening for directing a first portion of the light emanating from said light source towards the optical axis of said objective, means for deflecting said first portion of the light into said optical axis of said objective, said light distributing member including a hollow open extension for directing a second portion of the light emanating from said light source in a direction diverging from the direction of said first portion of the light, and controlling means operatively connected with said rockable light distributing member for setting same with its extension in a predetermined position whereby the optical axis of said extension may be placed in a position to intersect the optical axis of the objective at the defining line of the work piece to be observed in the microscope.

3. A tool maker's microscope for detachable mounting in a spindle of a machine tool comprising in combination: connecting means for co-axial insertion into the bore of said spindle; a casing mounted on said connecting means; an objective arranged on said casing, the optical axis of said objective coinciding with the axis of said connecting means whereby said optical axis of the objective coincides with the axis of said spindle when said connecting means is inserted into said bore; viewing means arranged on said casing, the optical axis of said viewing means extending angularly to said optical axis of said objective; said casing having a chamber lateral to said optical axis of said objective and having a first opening facing said optical axis of said objective and a second opening in the bottom of said chamber; an illuminating member rockably mounted within said chamber and projecting downwardly through said second opening of said chamber and being rockable between two end positions in at least one of said end positions the optical axis of said illuminating member intersects the optical axis of said objective outside the microscope; an aperture provided in said illuminating member opposite said first opening; a light source accommodated within said chamber and said illuminating member to produce light, one portion of said light travelling through said aperture and said first opening towards said optical axis of said objective while a second portion of said light extends through said illuminating member along the optical axis of the latter; and means for deflecting said first mentioned light portion into said optical axis of said objective and through the latter from above.

4. A tool maker's microscope as claimed in claim 3, wherein said illuminating member comprises a tubular portion projecting through said second opening and a cylindrical portion merging into said tubular portion, said cylindrical portion and said tubular portion being mutually perpendicular, said cylindrical portion partly enclosing said light source and being rockably mounted in complementarily shaped wall portions of said chamber.

5. A tool maker's microscope as claimed in claim 4, wherein said cylindrical portion comprises a first aperture for the passage of said first light portion and a second aperture for the insertion of said light source.

6. In combination with a tool maker's microscope as claimed in claim 3, the arrangement of auxiliary means on said illuminating member for rocking and adjusting said illuminating member between said two end portions.

7. A tool maker's microscope as claimed in claim 6, wherein said auxiliary means is constituted by knobs operatively connected to said illuminating member and mounted on said casing.

8. In combination with a tool maker's microscope as claimed in claim 1, the arrangement of adjustable index means, said adjustable index means being arranged within said viewing means.

9. In a tool maker's microscope as claimed in claim 8, wherein said adjustable index means are comprised of a plate with crossed wires which is adjustable in the direction of the wires by screws operatively connected with said plate and arranged on the wall of said viewing means.

10. In a tool maker's microscope as claimed in claim 1, wherein said connecting means is cone-shaped.

11. In a tool maker's microscope as claimed in claim 3, wherein said illuminating member comprises a tubular portion projecting through said second opening with play and a cylindrical portion merging into said tubular portion, said cylindrical portion and said tubular portion being mutually perpendicular, said cylindrical portion at least partly enclosing said light source, and said cylindrical portion being rockably mounted in complementarily shaped wall portions of said chamber so that the rocking axis of said cylindrical portion always passes through the point of intersection of the optical axes of said two light portions.

References Cited in the file of this patent

UNITED STATES PATENTS

| | | |
|---|---|---|
| 1,631,329 | Patterson | June 7, 1927 |
| 2,146,904 | McFarlane et al. | Feb. 14, 1939 |
| 2,483,897 | Godfrey | Oct. 4, 1949 |
| 2,557,029 | Griffen | June 12, 1951 |

FOREIGN PATENTS

| | | |
|---|---|---|
| 316,055 | Germany | Nov. 18, 1919 |